(12) United States Patent
Zhou

(10) Patent No.: US 9,964,693 B2
(45) Date of Patent: May 8, 2018

(54) MONITOR AND THE BACKLIGHT MODULE THEREOF

(71) Applicant: Wuhan China Star Optoelectronics Technology Co., Ltd., Wuhan, Hubei (CN)

(72) Inventor: Gege Zhou, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 171 days.

(21) Appl. No.: 14/997,811

(22) Filed: Jan. 18, 2016

(65) Prior Publication Data
US 2017/0139121 A1    May 18, 2017

(30) Foreign Application Priority Data

Nov. 17, 2015   (CN) .......................... 2015 1 0792016

(51) Int. Cl.
*G02B 6/00*   (2006.01)
*F21V 8/00*   (2006.01)

(52) U.S. Cl.
CPC ......... *G02B 6/0088* (2013.01); *G02B 6/0026* (2013.01); *G02B 6/0055* (2013.01); *G02B 6/0068* (2013.01); *G02B 6/0073* (2013.01)

(58) Field of Classification Search
CPC ............................ G02B 6/0026; G02B 6/0073
See application file for complete search history.

(56) References Cited

U.S. PATENT DOCUMENTS

| | | | |
|---|---|---|---|
| 2011/0309325 A1* | 12/2011 | Park ..................... | H01L 25/0753 257/13 |
| 2012/0155115 A1 | 6/2012 | Jang | |
| 2013/0050612 A1* | 2/2013 | Hur ................... | G02F 1/133603 349/62 |
| 2013/0050616 A1* | 2/2013 | Seo ................... | G02F 1/133603 349/71 |
| 2013/0265784 A1* | 10/2013 | Nieberle .................. | F21S 8/00 362/382 |
| 2013/0271961 A1* | 10/2013 | Nakamura ................ | F21V 9/00 362/97.2 |
| 2013/0336003 A1* | 12/2013 | Yang ....................... | G02B 6/42 362/608 |

(Continued)

FOREIGN PATENT DOCUMENTS

| | | |
|---|---|---|
| CN | 2683993 Y | 3/2005 |
| KR | 1020110012246 A | 2/2011 |

*Primary Examiner* — Julie Bannan
(74) *Attorney, Agent, or Firm* — Andrew C. Cheng

(57) ABSTRACT

The present disclosure discloses a monitor and a backlight module thereof. The backlight module includes a circuit board, a strip light, a buckle, and a quantum tube. The strip light is fixed to the circuit board. The buckle is fixed to the circuit board. The quantum tube is engaged into the buckle, and the quantum tube is parallel to the strip light, which are provided with an interval. The quantum tube is located between the light guide plate and the strip light, the light is emitted from the strip light to the light guide plate through the quantum tube. Through the above way, the present disclosure can ensure high luminous efficiency of the quantum tube in the backlight module, so that the color gamut of the backlight module is maintained at a high state.

9 Claims, 4 Drawing Sheets

(56) References Cited

U.S. PATENT DOCUMENTS

| | | | |
|---|---|---|---|
| 2014/0036532 A1* | 2/2014 | Lee | G02B 6/0021 |
| | | | 362/608 |
| 2015/0226904 A1* | 8/2015 | Bae | G02B 6/0086 |
| | | | 362/608 |
| 2015/0234111 A1* | 8/2015 | Lee | G02B 6/0023 |
| | | | 362/608 |
| 2015/0241617 A1* | 8/2015 | Zhou | F21V 9/16 |
| | | | 362/608 |
| 2015/0338064 A1* | 11/2015 | Ishino | G02F 1/133615 |
| | | | 349/61 |
| 2016/0187563 A1* | 6/2016 | Lee | G02B 6/0023 |
| | | | 362/608 |

\* cited by examiner

MONITOR AND THE BACKLIGHT MODULE THEREOF

BACKGROUND OF THE DISCLOSURE

1. Field of the Disclosure

The present disclosure relates to the fields of display technology, and in particular to a monitor and the backlight module thereof.

2. The Related Arts

At present, the display device as a display section of electronic equipment has been widely used in various electronic products. The demand of consumers for the color vividness of the devices is increasing. Therefore, it is necessary to increase the color gamut of the display device. Backlight module is an important component of the display device, so the demand for the color gamut of the strip light is bound to be higher and higher.

The backlight module typically includes a light source and a light guide plate. The light source emits light into the light guide plate, so that the light guide plate is lighted up. In order to increase the color gamut of the backlight module, it utilizes the design of the quantum tube by encapsulating quantum dot material into glass tube. The quantum tube is provided between the light source and the light guide plate. Because quantum tube is more brittle and easily broken, resulting in abnormal display. Especially, the light source is adjacent to the quantum tube, so that the light source easily contacts with the quantum tube. The light with higher temperature easily affects the luminous efficiency of the quantum tube, resulting in dramatically reduced color gamut values.

SUMMARY OF THE DISCLOSURE

The technical issue to be solved by the present disclosure is to provide a monitor and the backlight module thereof, which can avoid the quantum tubes in the backlight module contacting with the strip light with high temperature, affecting the luminous efficiency of the quantum tube, and further reducing the color gamut of the backlight module.

To solve the above technical issue, one aspect of the present disclosure is to provide a backlight module, comprising: a circuit board; a strip light, which is fixed to the circuit board; a buckle, which is fixed to the circuit board; a quantum tube, which is engaged into the buckle, the quantum tube being parallel to the strip light, which are provided with an interval; and a light guide plate, the quantum tube being located between the light guide plate and the strip light, the light being emitted from the strip light to the light guide plate through the quantum tube.

Wherein, the buckle comprises a bottom surface, two lateral surfaces provided with an interval and vertically connected with the bottom surface, and two wing surfaces respectively vertically connected with the two lateral surfaces and expanding outward relatively, the bottom surface of the buckle is fixed to the rear side of the circuit board, the wing surface is fixed to the front side of the circuit board, and the quantum tube is engaged between the two lateral surfaces.

Wherein, the distance between the quantum tube and the strip light is larger than the width of the wing surface.

Wherein, the amount of the buckle is two, the two buckles are respectively fixed to the circuit board and the corresponding position of the both ends of the quantum tube, the both ends of the quantum tube are respectively engaged into the corresponding position of the buckle.

Wherein, two card slots corresponding to the lateral surfaces of the buckle are opened from the end of the circuit board, the two lateral surfaces of the buckle are inserted into the card slot from the end of the circuit board, so that the buckle is assembled to the circuit board.

Wherein, the lateral surfaces of the buckle are inserted into the card slot through interference fit.

Wherein, the bottom surface of the buckle abuts the rear side of the circuit board, the wing surface of the buckle abuts the front side of the circuit board.

Wherein, the strip light comprises multiple strip LED lights arranged in line and mutually spaced, the multiple strip LED lights are respectively fixed to the circuit board.

Wherein, the backlight module further comprises: a back frame, the light guide plate, the circuit board, the strip light, the quantum tube, and the buckle being located inside the back frame; an optical film and a reflective sheet, the light guide plate being located between the optical film and the reflective sheet, the optical film being located at the light exit surface of the light guide plate, the reflective sheet being located at the opposite side of the light exit surface of the light guide plate; and a middle frame, the middle frame, the strip light and the quantum tube being located at the lateral surface of the light guide plate.

To solve the above technical issue, another aspect of the present disclosure is to provide a monitor, comprising a display panel and a backlight module. The backlight module provides backlight for the display panel, the backlight module is the backlight module as mentioned above.

The beneficial effects of the present disclosure are as follows. Differ from the case of the prior art, the present disclosure fixes the quantum tube on the circuit board through the buckle, and the quantum tube and the strip light are provided with an interval after fixing, which can avoid the quantum tubes in the backlight module contacting with the strip light with high temperature, affecting the luminous efficiency of the quantum tube, and further reducing the color gamut of the backlight module. Therefore, it can ensure high luminous efficiency of the quantum tube in the backlight module, so that the color gamut of the backlight module is maintained at a high state.

DETAILED DESCRIPTION OF THE PREFERRED EMBODIMENTS

The detailed descriptions accompanying drawings and the embodiment of the present disclosure are as follows.

Figure 1:
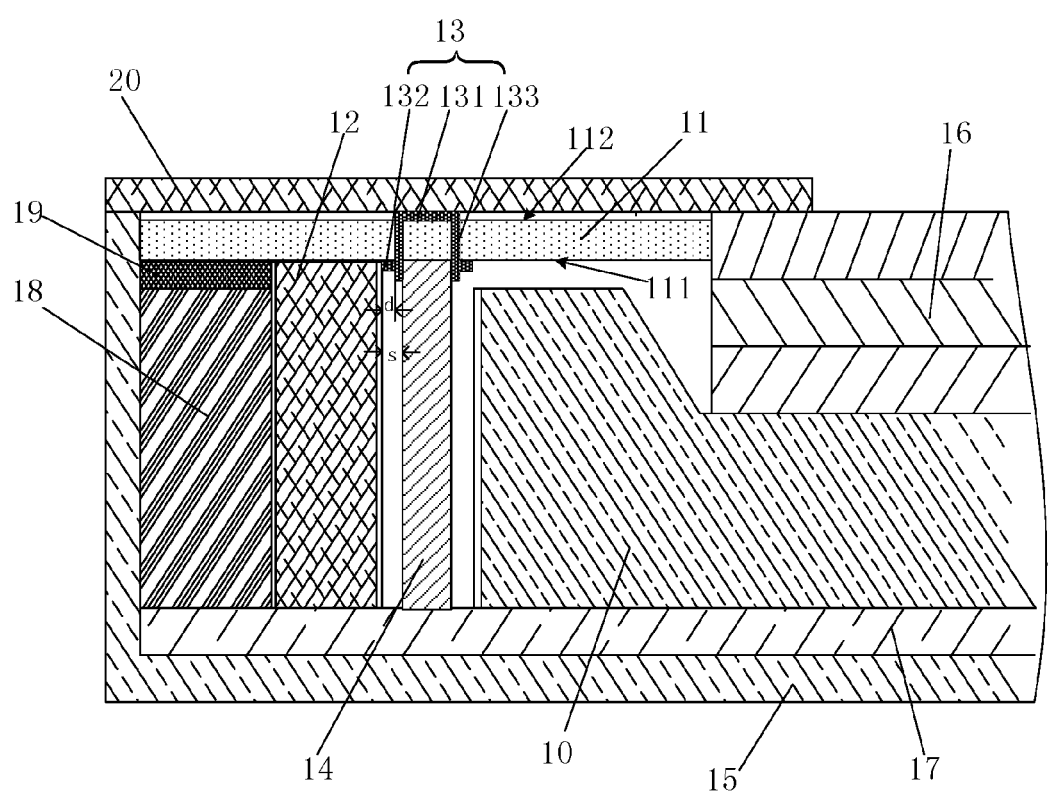
FIG. 1 is a schematic view illustrating the structure of the backlight module according to a preferred embodiment of the present disclosure.
Figure 2:
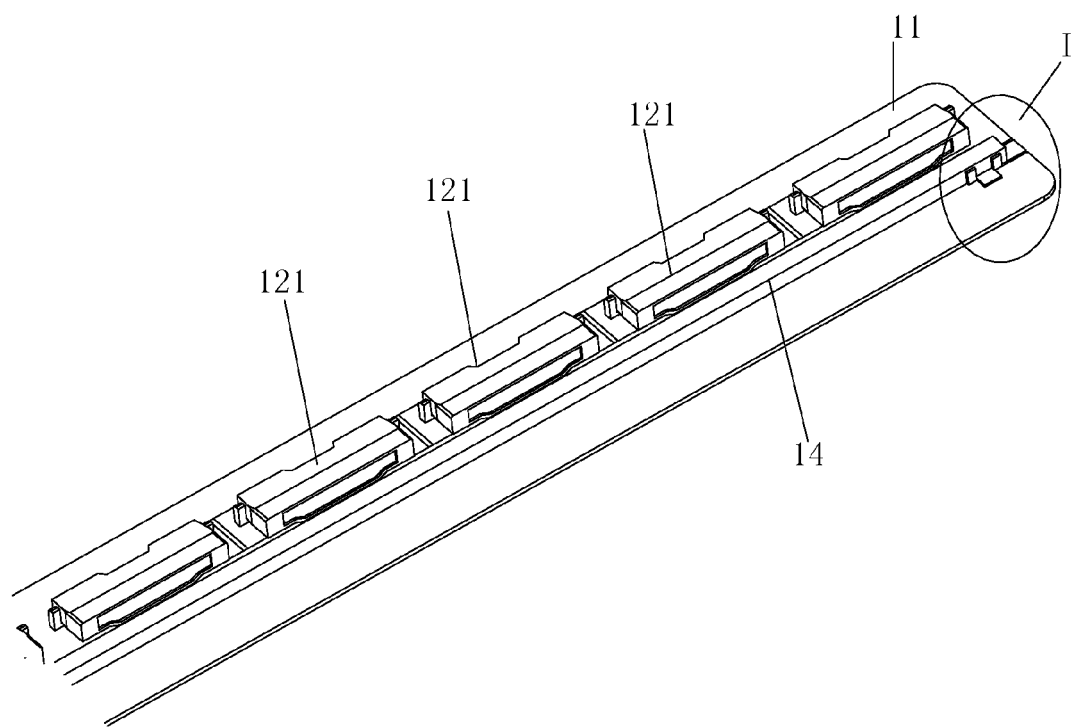
FIG. 2 is a schematic view illustrating the structure of the circuit board, the buckle, the quantum tube and the strip light mounted in the backlight module.
Figure 3:
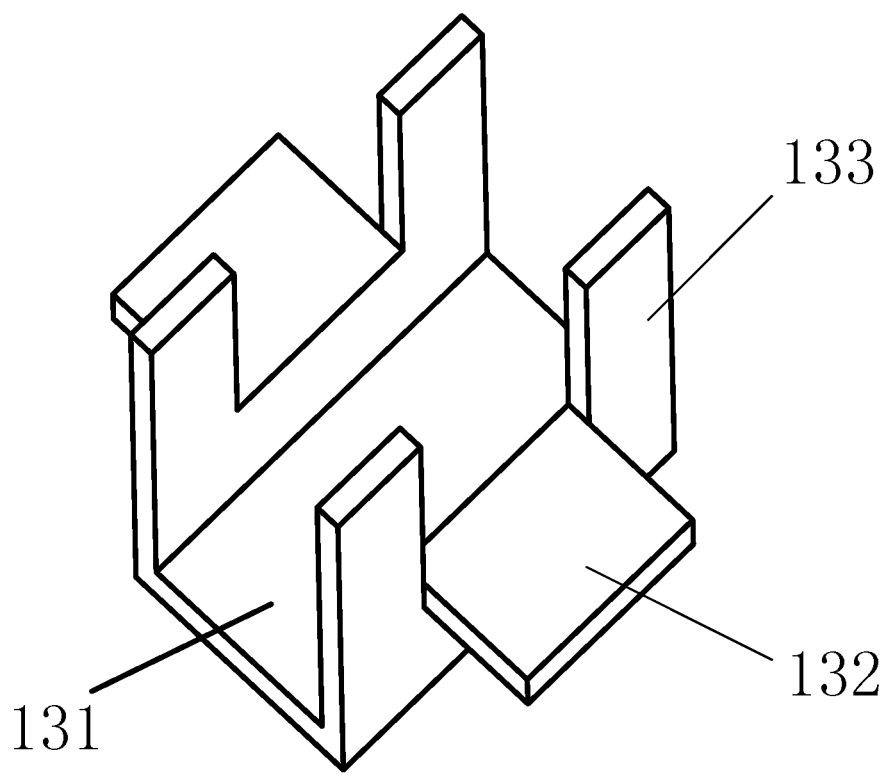
FIG. 3 is a schematic view illustrating the structure of the buckle according to the present disclosure.
Figure 4:
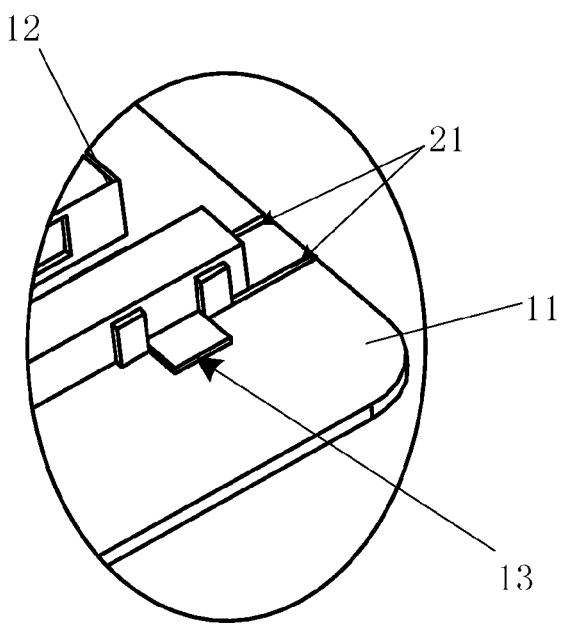
FIG. 4 is an enlarged view of the region I in FIG. 2.

Referring to FIGS. 1, 2, 3, and 4, FIG. 1 is a schematic view illustrating the structure of the backlight module according to a preferred embodiment of the present disclosure; FIG. 2 is a schematic view illustrating the structure of the circuit board, the buckle, the quantum tube and the strip light mounted in the backlight module; FIG. 3 is a schematic view illustrating the structure of the buckle according to the present disclosure; FIG. 4 is an enlarged view of the region I in FIG. 2. In the present embodiment, the backlight module comprises: a light guide plate 10, a circuit board 11, a strip light 12, a buckle 13, and a quantum tube 14. Preferably, the backlight module further comprises: a back frame 15, an optical film 16, a reflective sheet 17, and a middle frame 18.

The strip light 12 is fixed to the circuit board 11. Preferably, the strip light 12 is fixed to the front side 111 of the circuit board 11 by gluing.

The buckle 13 is fixed to the circuit board 11.

The quantum tube 14 is engaged into the buckle 13, and the quantum tube 14 is parallel to the strip light 12, which are provided with an interval. After the quantum tube 14 is engaged into the buckle 13, ensure there is an interval between the quantum tube 14 and the strip light 12, which avoids the heat of the strip light 12 affecting the efficiency of the quantum tube 14.

The quantum tube 14 is located between the light guide plate 10 and the strip light 12, the light is emitted from the strip light 12 to the light guide plate 10 through the quantum tube 14.

The light guide plate 10, the circuit board 11, the strip light 12, the quantum tube 14, and the buckle 13 are located inside the back frame 15.

The light guide plate 10 is located between the optical film 16 and the reflective sheet 17, the optical film 16 is located at the light exit surface of the light guide plate 10, and the reflective sheet 17 is located at the opposite side of the light exit surface of the light guide plate 10.

The middle frame 18, the strip light 12 and the quantum tube 14 are located at the lateral surface of the light guide plate 10. The middle frame 18 is preferably plastic box, which is provided around the light guide plate 10. The strip light 12 and the quantum tube 14 are only on one side of the light guide plate 10, that is, the backlight module according to the present disclosure is a side-backlight. The reflective sheet 17 and the optical film 16 are fixed on the middle frame 18 through the light-shielding double-sided adhesive (not shown). The light-shielding double-sided adhesive is not only used to locate the optical film 16 and the reflective sheet 17, but also used for light shielding. The quantum tube 14 is provided between the strip light 12 and the light guide plate 10, so that the light emitted from the strip light 12 excites the quantum dot material in the quantum tube 14, which emits the light with high color gamut through the light guide plate 10, achieving the purpose of backlight with high color gamut. Preferably, the quantum tube 14 is formed by the quantum dot material encapsulated in a glass tube.

Preferably, the buckle 13 comprises a bottom surface 131, two lateral surfaces 133 provided with an interval and vertically connected with the bottom surface 131, and two wing surfaces 132 respectively vertically connected with the two lateral surfaces 133 and expanding outward relatively. The bottom surface 131 of the buckle 13 is fixed to the rear side 112 of the circuit board 11, the wing surface 132 is fixed to the front side 111 of the circuit board 11, and the quantum tube 14 is engaged between the two lateral surfaces 133.

Preferably, there are two notches on the lateral surfaces 133 of the buckle 13. During the molding process of the buckle 13, the two wing surfaces 132 are bent to be perpendicular to the lateral surfaces 133 to form the two notches. Therefore, it can save material and no need to additionally weld the wing surface.

In one embodiment, the distance s between the quantum tube 14 and the strip light 12 is larger than the width d of the wing surface 133.

In one embodiment, the amount of the buckle 13 is two. The two buckles 13 are respectively fixed to the circuit board 11 and the corresponding position of the both ends of the quantum tube 14. The both ends of the quantum tube 14 are respectively engaged into the corresponding position of the buckle 13. FIG. 2 only shows one buckle 13, but the skilled person can well imagine that the other end of the quantum tube 14 can also be provided with a buckle 13 in the same way.

In one embodiment, two card slots 21 corresponding to the lateral surfaces 133 of the buckle 13 are opened from the end of the circuit board 11. The two lateral surfaces 133 of the buckle 13 are inserted into the card slot 21 from the end of the circuit board 11, so that the buckle 13 is assembled to the circuit board 11.

In one embodiment, the lateral surfaces 133 of the buckle 13 are inserted into the card slot 21 through interference fit.

In one embodiment, the bottom surface 131 of the buckle 13 abuts the rear side 112 of the circuit board 11, and the wing surface 132 of the buckle 13 abuts the front side 111 of the circuit board 11.

In one embodiment, the strip light 12 comprises multiple strip LED lights 121 arranged in line and mutually spaced. The multiple strip LED lights 121 are respectively fixed to the circuit board 11. Preferably, the multiple strip LED lights 121 are fixed to the front side of the circuit board 11 by gluing.

In one embodiment, the back frame 15 is preferably a metal frame.

In one embodiment, the backlight module further comprises a light shielding layer 20. The light shielding layer 20 is provided on the rear side 112 of the circuit board 11.

In one embodiment, the circuit board 11 is fixed to the middle frame 18 through a double-sided adhesive 19.

Figure 5:
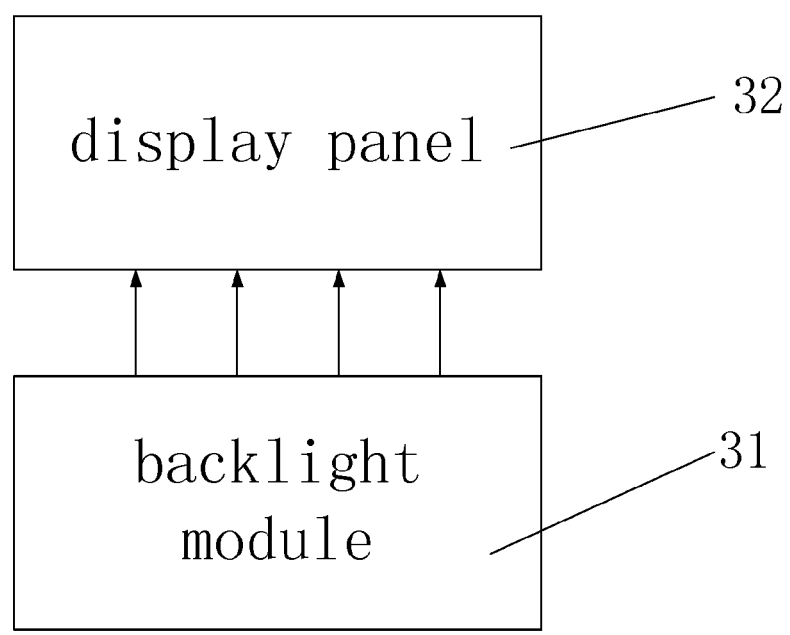
FIG. 5 is a schematic view illustrating the structure of the monitor according to the present disclosure.

Referring to FIG. 5, FIG. 5 is a schematic view illustrating the structure of the monitor according to the present disclosure. The monitor comprises the backlight module 31 and the display panel 32 as mentioned above. The backlight module 31 provides backlight for the display panel 32.

Embodiments of the present disclosure have been described, but not intending to impose any unduly constraint to the appended claims. Any modification of equivalent structure or equivalent process made according to the disclosure and drawings of the present disclosure, or any application thereof, directly or indirectly, to other related fields of technique, is considered encompassed in the scope of protection defined by the claims of the present disclosure.

What is claimed is:

1. A backlight module, comprising:
   a circuit board;
   a strip light, which is fixed to the circuit board;
   a buckle, which is fixed to the circuit board;
   a quantum tube, which is engaged into the buckle, the quantum tube being substantially parallel to the strip light, which are provided with an interval;
   a light guide plate, the quantum tube being located between the light guide plate and the strip light, the light being emitted from the strip light to the light guide plate through the quantum tube; and
   wherein the buckle comprises a bottom surface, two lateral surfaces provided with an interval and vertically connected with the bottom surface, and two wing surfaces respectively vertically connected with the two lateral surfaces and expanding outward relatively, the bottom surface of the buckle is fixed to the rear side of the circuit board, the wing surface is fixed to the front side of the circuit board, and the quantum tube is engaged between the two lateral surfaces.

2. The backlight module as claimed in claim 1, wherein the distance between the quantum tube and the strip light is larger than the width of the wing surface.

3. The backlight module as claimed in claim 1, wherein the amount of the buckle is two, the two buckles are respectively fixed to the circuit board and the corresponding position of the both ends of the quantum tube, the both ends of the quantum tube are respectively engaged into the corresponding position of the buckle.

4. The backlight module as claimed in claim 3, wherein two card slots corresponding to the lateral surfaces of the buckle are opened from the end of the circuit board, the two lateral surfaces of the buckle are inserted into the card slot from the end of the circuit board, so that the buckle is assembled to the circuit board.

5. The backlight module as claimed in claim 4, wherein the lateral surfaces of the buckle are inserted into the card slot through interference fit.

6. The backlight module as claimed in claim 4, wherein the bottom surface of the buckle abuts the rear side of the circuit board, the wing surface of the buckle abuts the front side of the circuit board.

7. The backlight module as claimed in claim 1, wherein the strip light comprises multiple strip LED lights arranged in line and mutually spaced, the multiple strip LED lights are respectively fixed to the circuit board.

8. The backlight module as claimed in claim 1, further comprising:
   a back frame, the light guide plate, the circuit board, the strip light, the quantum tube, and the buckle being located inside the back frame;
   an optical film and a reflective sheet, the light guide plate being located between the optical film and the reflective sheet, the optical film being located at the light exit surface of the light guide plate, the reflective sheet being located at the opposite side of the light exit surface of the light guide plate; and
   a middle frame, the middle frame, the strip light and the quantum tube being located at the lateral surface of the light guide plate.

9. A monitor, comprising a display panel and a backlight module, the backlight module providing backlight for the display panel, the backlight module being the backlight module as claimed in claim 1.

* * * * *